United States Patent
Markyvech et al.

(10) Patent No.: US 6,233,512 B1
(45) Date of Patent: May 15, 2001

(54) METHOD/SYSTEM FOR CONTROLLING UPSHIFTING IN AN AUTOMATED MECHANICAL TRANSMISSION SYSTEM

(75) Inventors: Ronald K. Markyvech, Allen Park; Gerald E. Ganski, Lawton, both of MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/149,486

(22) Filed: Sep. 8, 1998

(51) Int. Cl.[7] .............................. B60K 41/24; G06F 7/00
(52) U.S. Cl. .............................. 701/51; 701/52; 477/904; 477/905
(58) Field of Search .................... 701/51, 52, 53, 701/54, 61, 62, 64, 95; 477/34, 36, 110, 115, 107, 108, 904, 905

(56) References Cited

U.S. PATENT DOCUMENTS

| 4,361,060 | 11/1982 | Smyth ............................ 74/866 |
| 4,551,802 | 11/1985 | Smyth ............................ 364/424.1 |
| 4,595,986 | 6/1986 | Daubenspeck et al. ......... 364/424.1 |
| 4,852,006 | 7/1989 | Speranza ........................ 364/424.1 |
| 4,916,979 | 4/1990 | Irwin ............................... 74/866 |
| 4,970,916 | 11/1990 | Narita ............................. 74/866 |
| 5,044,230 | 9/1991 | Shinya et al. .................... 74/866 |
| 5,053,963 | 10/1991 | Mack .............................. 364/424.1 |
| 5,267,492 | 12/1993 | Furukawa et al. .............. 74/866 |
| 5,406,861 | 4/1995 | Steeby ............................ 74/336 |
| 5,409,432 | 4/1995 | Steeby ............................ 477/71 |

FOREIGN PATENT DOCUMENTS

| 0273735 | 7/1988 | (EP) . |
| 0857898 | 8/1998 | (EP) . |

Primary Examiner—William A. Cuchlinski, Jr.
Assistant Examiner—Yonel Beaulieu
(74) Attorney, Agent, or Firm—Howard D. Gordon

(57) ABSTRACT

A control system/method to minimize unwanted multiple upshifts in an automated mechanical transmission system (12). After a full-throttle upshift (54A), the engine speeds at which upshifts are commanded are increased from a default value (54) to a modified value (72) until the occurrence of a reset event.

18 Claims, 4 Drawing Sheets

METHOD/SYSTEM FOR CONTROLLING UPSHIFTING IN AN AUTOMATED MECHANICAL TRANSMISSION SYSTEM

BACKGROUND OF THE INVENTION

1. Field of the Invention

The present invention relates to improved shift logic for an automated vehicular mechanical transmission system. In particular, the present invention relates to a control method/system having logic rules whereby an upshift under certain vehicle operating conditions will result in temporarily modifying the shift schedule to minimize the occurrence of unwanted multiple upshifting.

2. Description of the Prior Art

Fully and partially automated vehicular mechanical transmission systems are known in the prior art, as may be seen by reference to U.S. Pat. Nos. 4,361,060; 4,595,986; 4,648,290; 5,109,721; 5,393,276; 5,409,432 and 5,425,284, the disclosures of which are incorporated herein by reference. Such transmissions having an automatic shift mode typically base shift decisions upon shift point profiles or shift schedules, which often are graphically represented on a graph of throttle position versus engine or vehicle speed. It is known to temporarily modify these shift profiles in view of various sensed vehicle operating conditions to modify vehicle performance, for antihunt purposes or the like. Examples of such shift logic may be seen by reference to U.S. Pat. Nos. 4,361,060; 4,551,802; 4,852,006; 4,916,979; 5,053,963 and 5,406,861, the disclosures of which are incorporated herein by reference.

A problem not addressed by the prior art shift logic involves unwanted, repetitive upshifting which often occurred after a desired upshift, typically a full- or substantially full-throttle upshift, if the vehicle operator then let up on the throttle. This problem is of special concern in light- and medium-duty trucks and other vehicles (MVMA Class 2–6 vehicles) having 5-to-8-forward-speed transmissions and utilizing gasoline or diesel engines having a governed top speed of about 2600 RPM, rather than heavy-duty vehicle diesel engines typically coupled to 10-to-18-speed transmissions and governed to about 1900 RPM.

SUMMARY OF THE INVENTION

In accordance with the present invention, a new and improved automated change-gear shift control, including improved upshift control logic, is provided.

This is accomplished by providing logic rules whereby, under certain operating conditions and/or operator actions, the normally utilized upshift schedule is modified to prevent unwanted, repetitive upshifts. By way of example, after an upshift, if throttle is above a certain reference value, the normally instituted upshift shift points are increased for a period of time or until engine speed falls below a reset reference value.

Accordingly, it is an object of the present invention to provide a new and improved automated change-gear transmission shift control system/method.

This and other objects and advantages of the present invention will become apparent from a reading of the following description of the preferred embodiment taken in connection with the attached drawings.

DESCRIPTION OF THE PREFERRED EMBODIMENT

Figure 1:
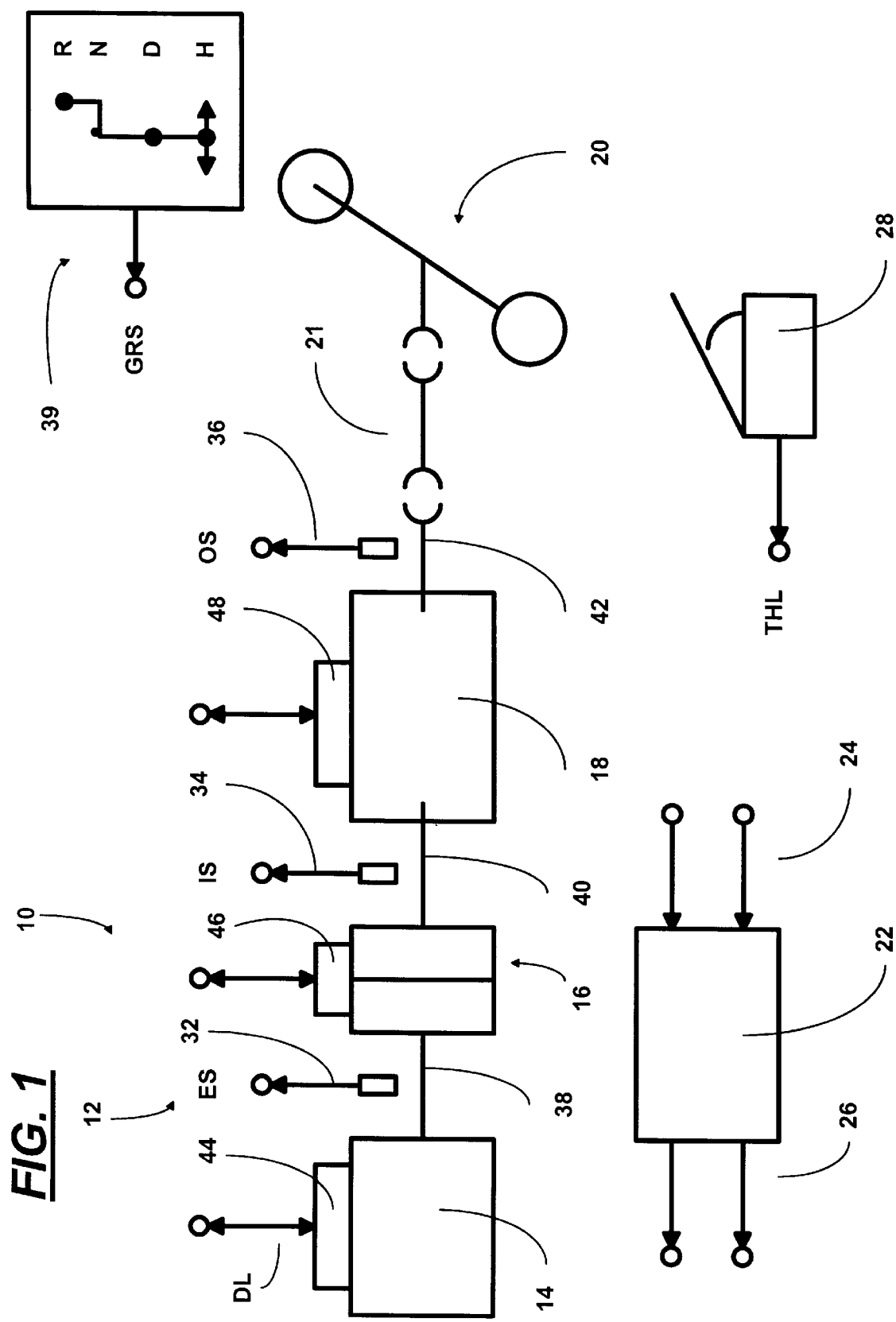
FIG. 1 is a schematic illustration of an at least partially automated vehicular mechanical transmission system utilizing the control logic of the present invention.

FIG. 1 illustrates a vehicle driveline 10 including an at least partially automated mechanical transmission system 12 utilizing the upshift control logic of the present invention. Powertrain 10 includes an internal combustion engine 14 (such as a gasoline or diesel engine), a master clutch 16, a mechanical transmission 18 (such as a 5-to-7-speed, medium-duty transmission), and a drive axle assembly 20 driven by propeller shaft 21. While the present invention is particularly well suited for medium-duty vehicles, it is not so limited.

Transmission 18 may be of a standard 5-, 6-, 7-, 9-, 10-, 12- or greater forward speed design. Examples of such transmissions may be seen by reference to U.S. Pat. Nos. 4,373,403; 4,754,665; and 5,390,561, the disclosures of which are incorporated herein by reference.

The automated transmission system 12 preferably will include a microprocessor-based controller 22 for receiving various input signals 24 and processing same according to logic rules to issue command output signals 26 to various system actuators. Controllers of this type are known, as may be seen by reference to aforementioned U.S. Pat. Nos. 4,361,060 and 4,595,986.

A throttle position sensor 28 provides a signal THL indicative of operator-set throttle position, a shift selector 30 provides a signal GRS indicative of selected transmission operating mode and/or of a request for an up- or downshift for a currently engaged ratio, speed sensors 32, 34 and 36 provide signals ES, IS and OS, respectively, indicative of the rotational speed of the engine crank shaft 38, the transmission input shaft 40 and the transmission output shaft 42, respectively.

An engine controller 44 is provided for controlling speed or torque of the engine, a clutch actuator 46 is provided for controlling operation of the master clutch, and a transmission operator 48 is provided to control shifting of the transmission.

The ECU 22 may be separate or integral with the engine controller 44. The various controllers, sensors and/or actuators may communicate over a data bus conforming to an industry standard protocol, such as SAE J-1939 or the like.

Suitable sensors and actuators are known to those of ordinary skill in the art and examples thereof, not intended to be limiting, may be seen by reference to U.S. Pat. Nos. 4,361,060; 4,873,881; 4,974,468; 5,135,218; 5,279,172; 5,305,240; 5,323,669; 5,408,898; 5,441,137, 5,445,126; 5,448,483 and 5,481,170.

Figure 2:
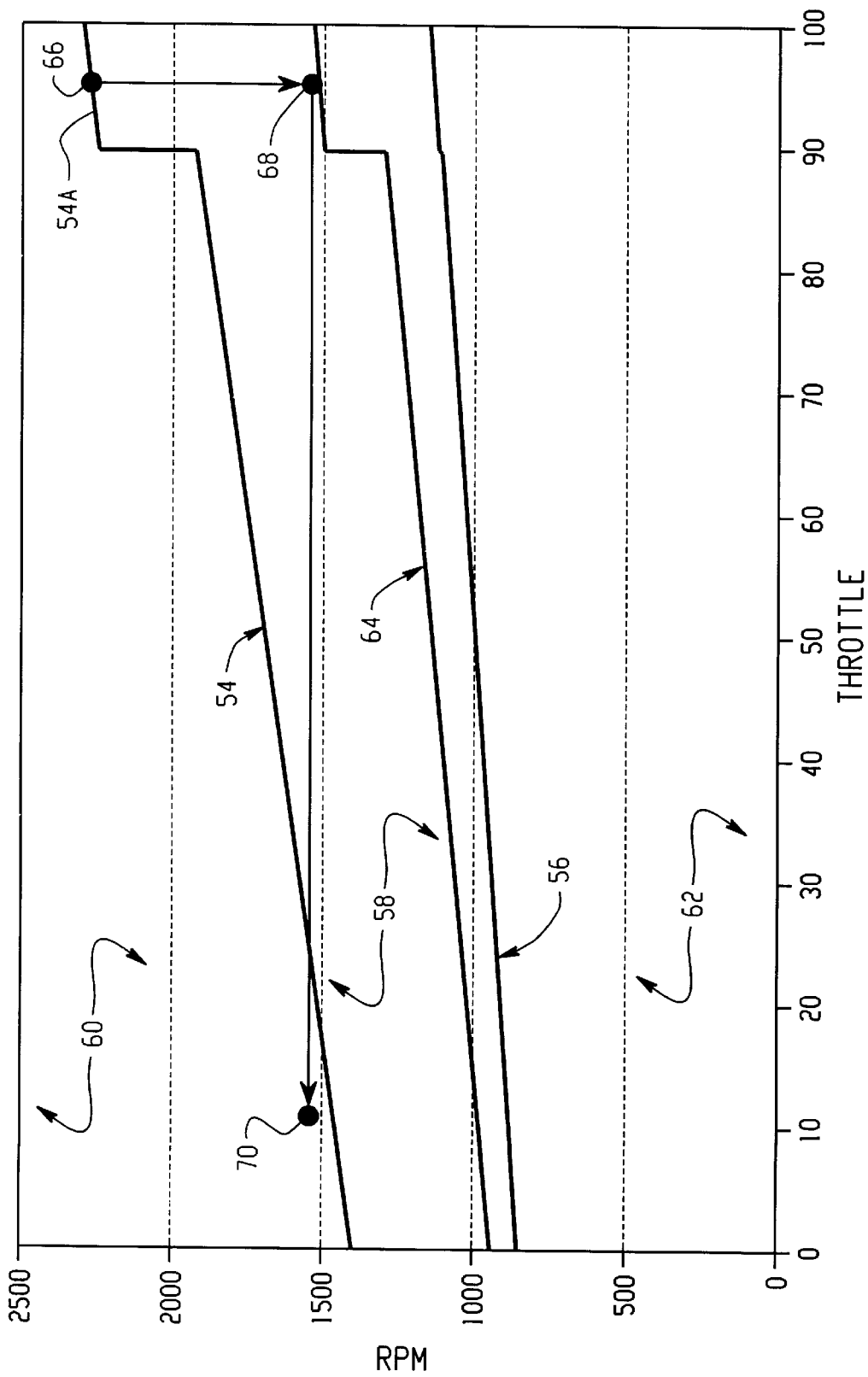
FIG. 2 is a schematic illustration, in graphical format, of a traditional shift schedule for a medium-duty vehicle.

As is known, in automated transmission systems of this type, when operating in an automatic shifting mode ("D" on selector 30), upshifts and downshifts are commanded according to a "shift schedule" or "shift point profile," a prior art version of which is illustrated in FIG. 2. Shift schedules, or the functional equivalents thereof, typically are stored in the memories of the controllers 22.

In FIG. 2, line 54 represents the upshift profile and line 56 represents the downshift profile. As a point representing engine speed and throttle pedal displacement crosses line 54 from area 58 in between lines 54 and 56 to area 60 above line 54, an upshift is commanded. As a point representing engine speed and throttle pedal displacement crosses line 56 from area 58 to area 62 below line 56, a downshift is commanded. As is also known, at relatively high throttle position, also referred to as at full or substantially full throttle (90 to 100% displacement), the upshift profile 54 is elevated (see portion 54A of line 54). After an upshift, assuming relatively constant vehicle speed, the RPM of engine will decrease by an amount determined by the ratio steps. Line 64 represents the expected engine speeds after an upshift.

A problem with the prior art shift schedules occurred if a full-throttle (i.e., greater than about 90% throttle displacement) upshift occurred and then the operator removed his foot from the throttle pedal, causing a low throttle (less than about 30% throttle) condition. This would cause a second, unintended upshift to be commanded.

By way of example, if an upshift was commanded at point 66, the RPM would then decrease to point 68. If the operator then removed his foot from the throttle pedal, the operating point would be point 70, at which a second, unintended upshift would be commanded.

Figure 3:
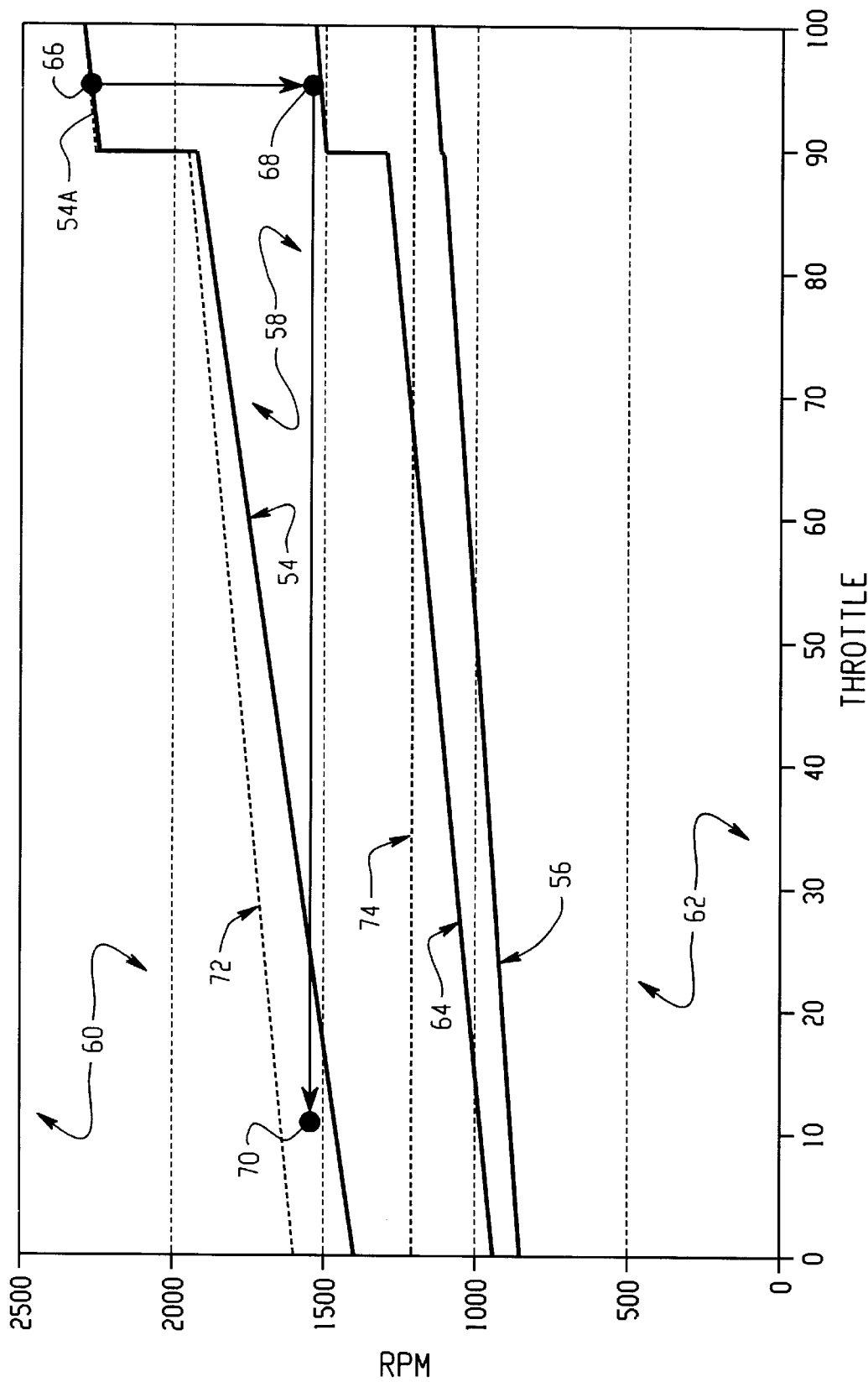
FIG. 3 is a schematic illustration, similar to FIG. 2 and in graphical format, of the shift schedule according to the control logic of the present invention.

The shift schedule of the present invention is schematically illustrated in FIG. 3. FIG. 3 is similar to FIG. 2, and functionally similar or identical elements are given like reference numerals and will be only briefly discussed.

FIG. 3 defines areas 58, 60 and 62 which are separated by upshift line 54 and downshift line 56. Line 64 indicates the expected engine rotational speed (RPM) after an upshift. Points 66, 68 and 70 represent, respectively, operating points at a full-throttle upshift, after a full-throttle upshift, and when throttle is released.

The shift logic of FIG. 3 differs from that of FIG. 2 in that after a full-throttle upshift, a modified upshift line 72 is invoked. It is noted that the modified upshift line 72 will not cause operation at point 70 (i.e., releasing the throttle pedal after a full-throttle upshift) to result in a command for a second, probably unwanted upshift. The modified upshift profile 72 preferably will remain effective after a full-throttle upshift until a predetermined condition occurs, such a time period expiring and/or engine rotational speed falling below a reset value 74. The modified upshift profile 72 has increased upshift engine RPM values in at least the lower (30% throttle or less) throttle positions.

Figure 4:
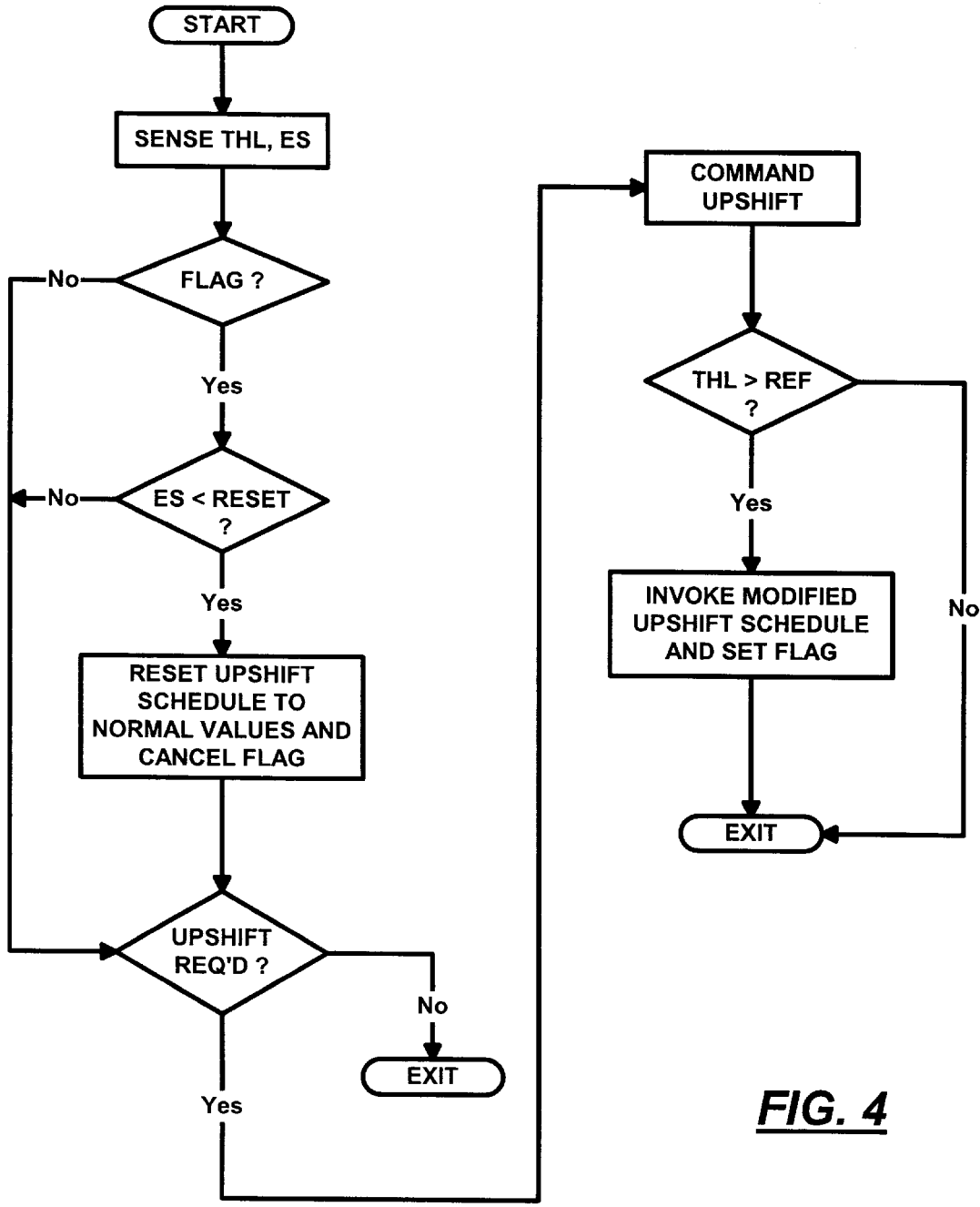
FIG. 4 is a schematic illustration, in flow chart format, of the upshift control logic of the present invention.

FIG. 4 is a flow chart representation of the shift logic of FIG. 3.

Accordingly, it may be seen that a new and improved control system/method for controlling upshifting in a fully or partially automated mechanical transmission is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A method for controlling upshifting in a vehicular automated mechanical transmission system comprising a fuel-controlled engine, a manually controlled device for providing a signal indicative of an operator's requested engine fueling, and a change-gear transmission having an input shaft driven by said engine and an output shaft, said transmission having a plurality of selectable ratios of input shaft rotational speed to output shaft rotational speed, a controller for receiving a plurality of input signals including (i) a first input signal indicative of the rotational speed of at least one of said engine, input shaft and output shaft, and (ii) a second input signal indicative of the operator's requested engine fueling and for processing said signals in accordance with logic rules to issue command output signals to system actuators, said logic rules causing an upshift to be commanded if at a given sensed value of said second signal, said first signal exceeds an upshift reference value for said given value of said second signal, said method comprising:

establishing a default first value for said upshift reference value;

upon sensing an upshift occurring when said second signal exceeds a full-throttle reference value, causing the upshift reference value for second signal values less than a low-throttle reference value to equal a modified second value, said modified second value exceeding said default first value; and after sensing the occurrence of a reset event, causing said upshift reference values to be reset to the default first value thereof.

2. The method of claim 1 wherein said controller is microprocessor-based.

3. The method of claim 1 wherein said full-throttle reference value is about 90% of full throttle.

4. The method of claim 1 wherein said low-throttle reference value is about 20% of full throttle.

5. The method of claim 1 wherein said reset event comprises a passage of time from sensing said upshift occurring when said second signal exceeds said full-throttle reference value.

6. The method of claim 1 wherein said reset event comprises said first signal being less than a reset reference value.

7. The method of claim 1 wherein said first signal is indicative of engine rotational speed.

8. The method of claim 2 wherein said first signal is read by said controller from an electronic data link.

9. An improved method for controlling an automatic transmission system for devices having a throttle-controlled engine, an operator-actuated throttling control means, and a transmission having a plurality of gear ratio combinations selectively engageable between a transmission input shaft and a transmission output shaft, said transmission input shaft being operatively connected to said engine, said transmission system comprising an information processing unit having means for receiving a plurality of input signals including (i) an input signal indicative of the position of said throttle controlling means and (ii) an input signal indicative of the rotational speed of said engine, said processing unit including means for processing said input signals in accordance with a program to provide a predetermined gear ratio for a given combination of input signals and for generating output signals to operate said transmission system in accordance with said program, and means associated with said transmission effective to actuate said transmission to effect engagement of one of said gear ratio combinations in response to said output signals from said processing unit, the improved method comprising:

sensing the presence or absence of an upshift occurring at substantially full throttle conditions; and modifying said program by increasing the engine speed at which an upshift will be commanded at substantially low throttle conditions in response to said processing unit sensing the presence of an upshift occurring at substantially full throttle conditions.

10. The improved method of claim 9 wherein substantially full throttle conditions are sensed if said throttle control is about 90% or greater of maximum throttle position and substantially low throttle conditions are those conditions where said throttle is about 30% or less of maximum throttle position.

11. A control system for controlling upshifting in a vehicular automated mechanical transmission system (12) comprising a fuel-controlled engine (14), a manually controlled device for providing a signal indicative of an operator requested engine fueling (28), and a change-gear transmission (18) having an input shaft (40) driven by said engine and an output shaft (42), said transmission having a plurality of selectable ratios of input shaft rotational speed to output shaft rotational speed, a controller (22) for receiving a plurality of input signals (24) including (i) a first input signal (ES, IS, OS) indicative of the rotational speed of at least one of said engine, input shaft and output shaft, and (ii) a second input signal (THL) indicative of the operator's requested engine fueling and for processing said signals in accordance with logic rules to issue command output signals (26) to system actuators (44, 46 and/or 48), said logic rules causing an upshift to be commanded if at a given sensed value of said second signal, said first signal exceeds an upshift reference value for said given value of said second signal, said control system characterized by said logic rules including rules for:

establishing a default first value (54) for said upshift reference value;

upon sensing an upshift occurring when said second signal exceeds a full-throttle reference value, causing the upshift reference value for second signal values less than a low-throttle reference value to equal a modified second value (72), said modified second value exceeding said default first value; and after sensing the occurrence of a reset event, causing said upshift reference values to be reset to the default first values thereof.

12. The control system of claim 11 wherein said controller is microprocessor-based.

13. The control system of claim 11 wherein said full-throttle reference value is about 90% of full throttle.

14. The control system of claim 11 wherein said low-throttle reference value is about 20% of full throttle.

15. The control system of claim 11 wherein said reset event comprises a passage of time from sensing said upshift occurring when said second signal exceeds said full-throttle reference values.

16. The control system of claim 11 wherein said reset event comprises said first signal being less than a reset reference value (74).

17. The control system of claim 11 wherein said first signal is indicative of engine rotational speed (ES).

18. The control system of claim 12 wherein said first signal is read by said controller from an electronic data link.

* * * * *